United States Patent
Ruden

(10) Patent No.: US 7,430,456 B2
(45) Date of Patent: Sep. 30, 2008

(54) REFERENCE POINT TEACHING USING AN END EFFECTOR TO FORM A WITNESS MARK

(75) Inventor: Shawn A. Ruden, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 278 days.

(21) Appl. No.: 11/350,350

(22) Filed: Feb. 8, 2006

(65) Prior Publication Data

US 2007/0185595 A1 Aug. 9, 2007

(51) Int. Cl.
G05B 19/04 (2006.01)
G05B 19/18 (2006.01)
G05B 15/00 (2006.01)
G05B 19/00 (2006.01)
G05B 19/42 (2006.01)
B25J 9/22 (2006.01)
B25J 15/02 (2006.01)

(52) U.S. Cl. .................... 700/253; 700/58; 700/59; 700/259; 700/264; 318/568.13; 318/568.21; 901/3; 901/30

(58) Field of Classification Search ............... 901/2, 901/3, 9, 10, 27–30, 46, 47; 700/235, 253, 700/259, 262, 264, 56–58; 318/568.11–568.13, 318/568.2, 568.21
See application file for complete search history.

(56) References Cited

U.S. PATENT DOCUMENTS

| | | | |
|---|---|---|---|
| 4,682,182 A * | 7/1987 | Oyama et al. ............ 347/106 |
| 4,882,527 A * | 11/1989 | Yakuyama et al. ..... 318/568.13 |
| 5,479,078 A | 12/1995 | Karakama et al. |
| 5,490,080 A * | 2/1996 | Jarrige et al. ................ 700/98 |
| 5,572,103 A | 11/1996 | Terada |
| 5,727,132 A | 3/1998 | Arimatsu et al. |
| 5,854,745 A * | 12/1998 | Muraoka et al. ............ 700/58 |
| 6,198,976 B1 * | 3/2001 | Sundar et al. ............... 700/59 |
| 6,299,931 B1 * | 10/2001 | Leary et al. ................. 427/8 |
| 6,352,354 B1 | 3/2002 | Boillot et al. |
| 6,452,134 B2 | 9/2002 | Hong |
| 6,519,507 B1 | 2/2003 | Noguchi et al. |
| 6,577,382 B2 * | 6/2003 | Kida et al. ................. 355/77 |

(Continued)

FOREIGN PATENT DOCUMENTS

| JP | 04083098 A | * | 3/1992 |
| JP | 2005193307 A | * | 7/2005 |

*Primary Examiner*—Crystal Barnes Bullock
(74) *Attorney, Agent, or Firm*—Fellers, Snider, et al.

(57) ABSTRACT

Apparatus and method for reference point teaching for an articulated member, such as a robotic arm. An end effector is moved to form a witness mark on a medium at a target location. An updated reference point for the end effector is generated in relation to a detected coordinate of the witness mark. The end effector preferably supports a gage with a tapered probe, and a distal end of the probe contactingly engages the medium to form the witness mark. A vision system preferably detects the position of the witness mark after retraction of the end effector away from the mark. The medium preferably comprises paper, and the witness mark preferably comprises a hole punched therethrough. Alternatively, the medium comprises pressure sensitive paper and the mark is formed by the application of pressure thereto. The gage can comprise two probes that make two spaced apart witness marks, as desired.

24 Claims, 4 Drawing Sheets

U.S. PATENT DOCUMENTS

| | | |
|---|---|---|
| 6,654,666 B1 | 11/2003 | Terada |
| 6,900,877 B2 * | 5/2005 | Raaijmakers ................ 355/53 |
| 7,356,918 B2 * | 4/2008 | Okuda et al. ................ 29/833 |
| 7,356,937 B2 * | 4/2008 | Nishibashi et al. ............ 33/502 |
| 2002/0134762 A1 * | 9/2002 | Okanda et al. ........... 219/86.51 |
| 2004/0186622 A1 * | 9/2004 | Aiuchi et al. ............... 700/241 |

* cited by examiner

US 7,430,456 B2

REFERENCE POINT TEACHING USING AN END EFFECTOR TO FORM A WITNESS MARK

FIELD OF THE INVENTION

The claimed invention relates generally to the field of automated systems and more particularly, but not by way of limitation, to an apparatus and method for using an end effector of an articulated member such as a robotic arm to form a witness mark during a reference point teaching operation.

BACKGROUND

Articulated members such as robotic arms are used in a wide variety of applications, such as automated manufacturing lines. Such members carry out a number of mechanically manipulative tasks such as picking and placing components onto an assembly, installing hardware, creating welds, etc.

Closed loop control techniques are often employed to ensure that the members are controllably moved with respect to a known reference point. In this way, a command to move the member to a given location can be translated into the correct actuator inputs to accurately drive the member to said location.

It is often desirable to calibrate, or "teach," the system in order to update the known reference point. This compensates for various errors that occur over time such as placement errors of the workpiece, deflection of the member, gain or noise errors in the control circuitry, etc.

While a variety of point teaching approaches have been proposed, there nevertheless remains a continual need for improvements in the art that increase accuracy, reduce computational complexity, and reduce or eliminate the effects of user subjectivity during the process. It is to these and other improvements that the claimed invention is generally directed.

SUMMARY OF THE INVENTION

Preferred embodiments of the present invention are generally directed to an apparatus and method for reference point teaching for an articulated member, such as a robotic arm.

In accordance with preferred embodiments, a control circuit is used to move an end effector to form a witness mark on a medium at a target location. An updated reference point for the end effector is generated in relation to a detected coordinate of the witness mark.

Preferably, the end effector supports a gage with a tapered probe, and a distal end of the probe contactingly engages the medium to form the witness mark. A vision system detects the position of the witness mark after retraction of the end effector away from the mark.

The medium preferably comprises paper, and the witness mark preferably comprises a hole punched through the paper. Alternatively, the medium comprises pressure sensitive paper and the mark is formed by the application of pressure thereto.

The gage can comprise two probes that make two spaced apart witness marks, as desired. This advantageously facilitates rotational angle error determination.

These and various other features and advantages which characterize the claimed invention will become apparent upon reading the following detailed description and upon reviewing the associated drawings.

DETAILED DESCRIPTION

Figure 1:
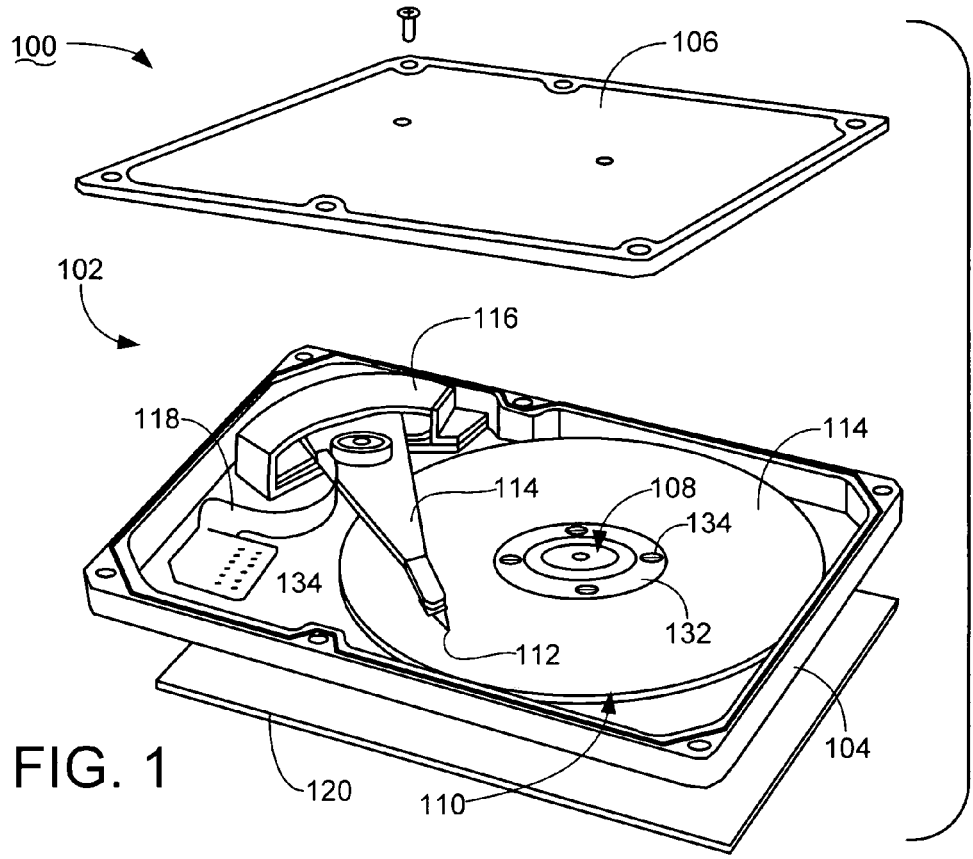
FIG. 1 is an exploded view of a data storage device.

FIG. 1 shows an exploded view of a data storage device 100. The device 100 provides an exemplary environment with which preferred embodiments of the present invention can be advantageously practiced. The device 100 is preferably characterized as a small form factor disc drive used to store and retrieve user data in a battery-operated, handheld mobile product such as a notebook computer or a digital camera.

The device 100 includes a rigid, environmentally controlled housing 102 formed by a base deck 104 and a top cover 106. A spindle motor 108 is mounted within the housing 102 to rotate a data storage disc 110 at a relatively high speed.

A data transducer (head) 112 writes data to and reads data from tracks defined on the disc 110. The transducer 112 is supported by an actuator 114 which is controllably moved by an actuator motor 116.

A flex circuit assembly 118 establishes electrical communication paths between the actuator 114 and a device printed circuit board (PCB) 120. The PCB 120 is mounted to an external surface of the base deck 104 and supports communication and control circuitry (not separately shown) used to interface the device 100 with a host system.

It is contemplated that the device 100 is manufactured in an automated, high volume manufacturing facility in which hundreds, or even thousands, of such devices are manufactured each day. Such a facility can include a number of assembly lines with numerous automated stations. The devices are conveyed via conveyor lines or similar to establish a flow through the process, with components successively added to provide the finally assembled products.

Figure 2:
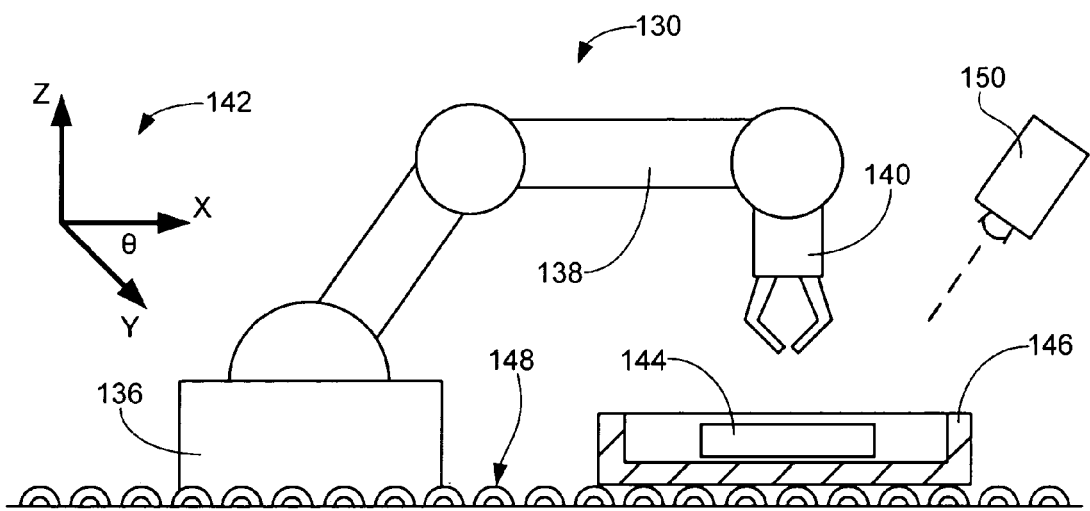
FIG. 2 is a simplified representation of an assembly station configured to contribute toward the assembly of the data storage device of FIG. 1 in accordance with preferred embodiments of the present invention.

Depending upon the activities performed, each station can include one or more articulated members, such as the simplified robotic assembly generally represented at 130 in FIG. 2. It will be contemplated that the assembly 130 is configured to pick and place a disc clamp 132 (FIG. 1) onto each spindle motor 106 in turn, and further to install the requisite hardware fasteners 134 (FIG. 1) to clamp the disc 110 thereto. Such characterization of the assembly 130 as forming part of a clamp installation station, however, is merely for purposes of the present discussion and is not limiting.

The assembly 130 is shown to include a base 136 which supports a cantilevered arm 138. An end effector 140 is supported at the distal end of the arm 138. A series of actuators (not separately shown) preferably permit controlled, multi-axis articulated of the end effector 140, such as along x, y, z and rotational (θ) axes 142.

The assembly 130 operates upon a workpiece 144, such as the base deck 102 of FIG. 1. The workpiece 144 is supported by a pallet 146 (shown in partial cutaway). The pallet 146 is conveyed to the assembly 130 via conveyor 148. Optical detection is provided by a vision system that includes a camera 150.

The station preferably includes a number of additional components to further assist the operation of the assembly 130, including control circuitry, conveyor motors, guides, actuated stops, clamp and hardware dispensers, power supplies, and so on. Such components are well known to those skilled in the art and thus have been omitted from FIG. 2 to simplify the present discussion.

During operation of the assembly 130, control inputs are supplied to move the end effector to carry out the requisite tasks to complete the installation of each clamp 132. Such tasks are carried out with reference to a known reference point. The reference point serves as a "nexus" between actual locations in the physical world and the mathematical representations of such locations by the control circuitry.

For example, in order to advance the end effector 140 to a desired position, the control circuitry generally calculates the existing location of the end effector, determines the distance and path to the desired position, and then applies the appropriate voltage or current control signals to the actuator(s) to move the end effector 140 along this distance and path.

It can be seen that the assembly 130 will generally operate to reliably carry out the assigned tasks so as long as close correlation exists between the reference point and the mathematical representation thereof maintained by the control circuitry. However, over time errors can propagate which, if unchecked, can result in the improper positioning of the end effector. This in turn will result in improperly manipulated components, failed operations, and even the generation of scrap product.

Figure 3:
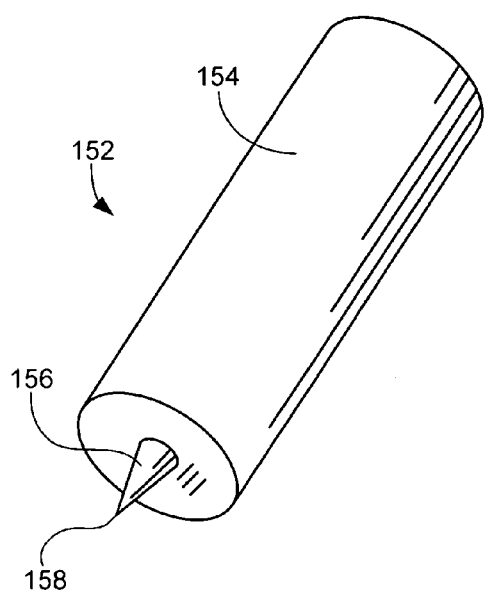
FIG. 3 is an isometric view of a gage configured to be supported by an end effector of the assembly station of FIG. 2.

Accordingly, preferred embodiments of the present invention are generally directed to the teaching of a new, updated reference point to an articulated member such as the assembly 130. As shown in FIG. 3, a gage 152 is configured to be installed onto the end effector 140 during such teaching operations. The gage 152 preferably includes a cylindrical body 154. A conical probe 156 extends from the body 154.

The body 154 and the probe 156 are preferably sized and arranged such that, upon installation of the gage 152 onto the end effector 140, a distal end 158 of the probe 156 is at a known position with respect to the rest of the end effector.

The attachment of the gage 152 to the end effector 140 can take place in any number of desired ways. In one embodiment, the gage 152 is inserted into the end effector and retractable collet (chuck-type) jaws clamp onto the body 154. Alternatively, threaded hardware is inserted through the end effector 140 and into the body 154. In yet another alternative, a vacuum port is used to secure the body 154 to the end effector 140.

Figure 4:
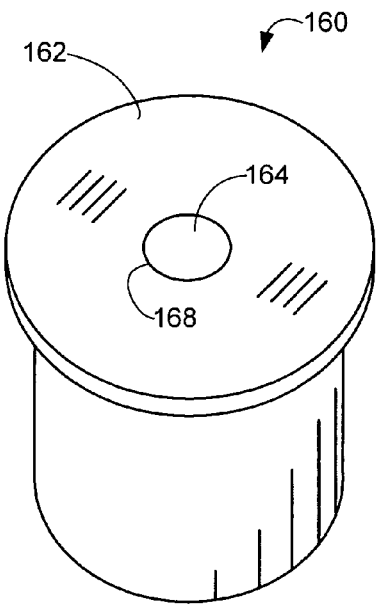
FIG. 4 shows a medium support member which supports a medium used in conjunction with the gage of FIG. 3.

FIG. 4 shows a reference base 160 which is preferably used with the gage 152 of FIG. 3. The base 160 comprises an annular plate 162 with a central recess to accommodate a medium 164. Preferably, the medium 164 comprises a layer of paper, although other materials can be used.

Figure 5:
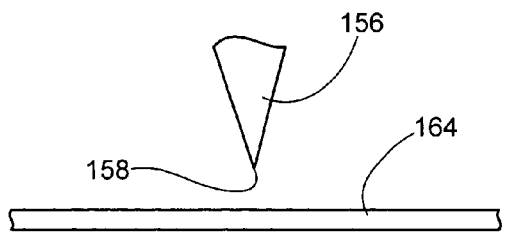
FIG. 5 shows a distal end of the gage of FIG. 3 adjacent the medium of FIG. 4.
Figure 6:
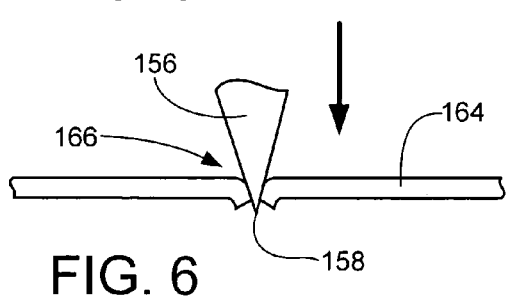
FIG. 6 shows an advancement of the gage to form a witness mark on the medium (in this case, a punched hole therethrough).
Figure 7:
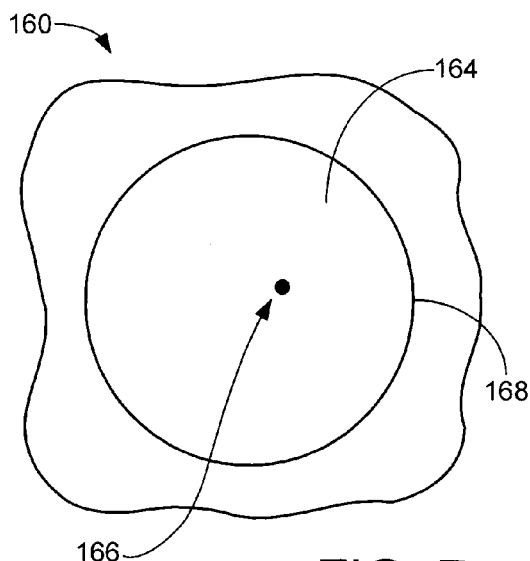
FIG. 7 is a top plan representation of the medium with the witness mark formed in FIG. 6.

As shown in FIGS. 5 and 6, the probe 156 is advanced to form a witness mark 166 on the medium 164, which in this embodiment comprises a punched hole therethrough. A top plan view of the resulting mark 166 is shown in FIG. 7. As desired, a datum feature is also provided on the base 160, such as circumferentially extending edge 168 that surrounds and nests the medium 164.

Figure 8:
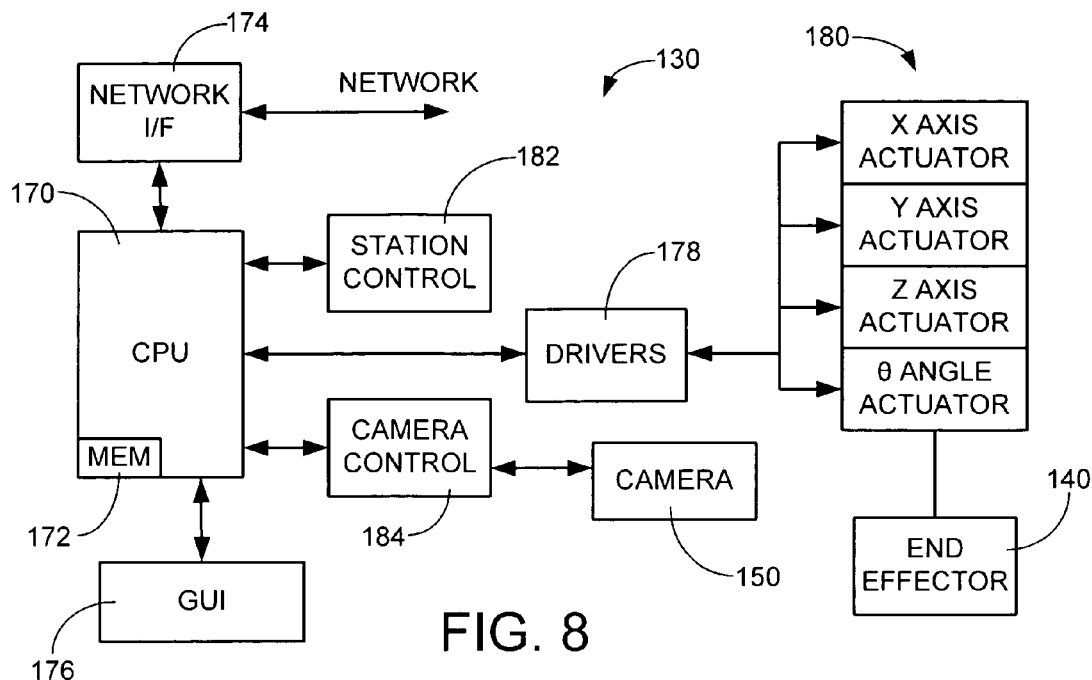
FIG. 8 is a functional block representation of the assembly station of FIG. 2.
Figure 9:
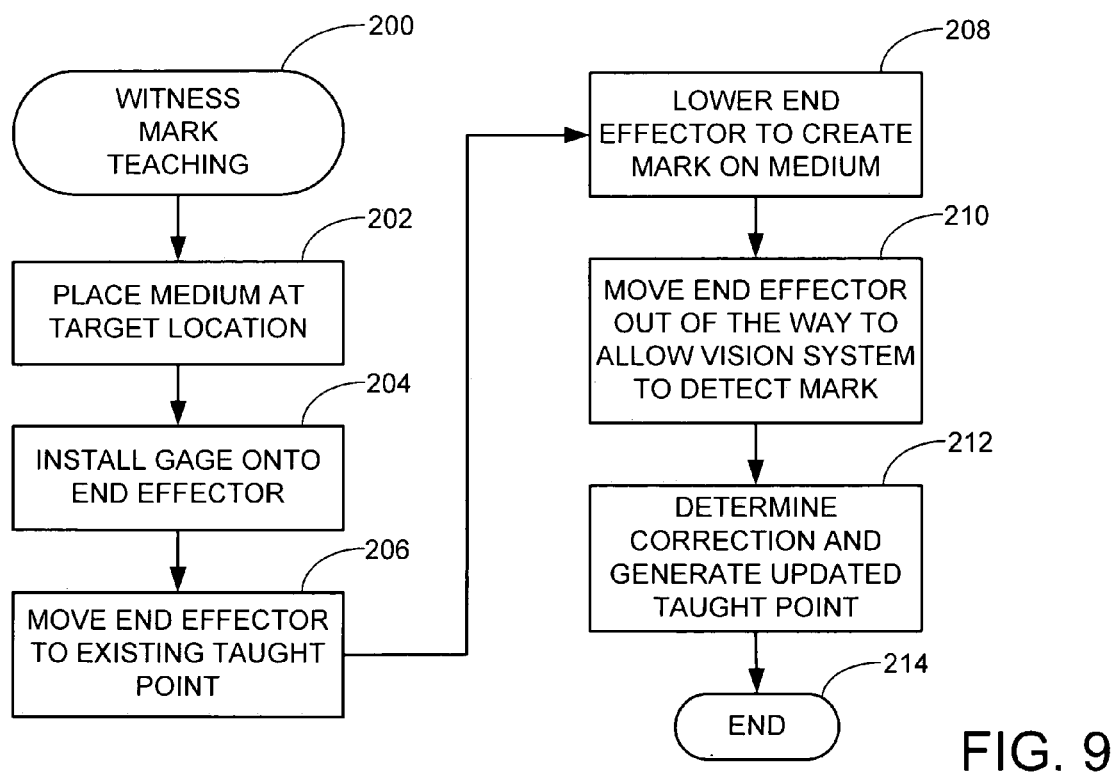
FIG. 9 is a flow chart for a WITNESS MARK TEACHING routine to set forth steps carried out by the assembly station in accordance with preferred embodiments.

The preferred manner in which the mark 166 is used during the teaching process can be understood with a review of FIGS. 8 and 9. FIG. 8 provides a functional block diagram of the assembly 130.

A central processing unit (CPU) 170 provides top level control of the assembly 130 using programming and data stored in CPU memory (MEM) 172. A network interface (I/F) block 174 facilitates communication of the CPU 170 with a computer network. A graphical user interface (GUI) 176 allows user input and displays data and results in human readable form, such as via a computer keyboard and monitor.

Driver circuitry 178 receives control inputs from the CPU 170 to provide corresponding control signals to a series of actuators 180. The actuators preferably comprise sliders or similar actuation mechanisms to permit controlled movement of the end effector 140 in the respective axes.

A station control block 182 represents additional control circuitry that is used to control remaining portions of the station. A camera control block 184 provides control and interface circuitry for the camera(s) 150.

FIG. 9 provides a flow chart for a WITNESS MARK TEACHING routine 200, representative of programming stored in CPU memory 172 and utilized by the CPU 170 at appropriate times during operation of the assembly 130. The routine 200 can be carried out on a time specified basis, such as at the beginning of each manufacturing shift. The routine 200 can also be carried out on a user selected basis, such as a result of the detection of an out of conformance operation by the assembly 130.

The medium 164 is first placed at a target location, as shown by step 202. Preferably, the target location is adjacent an existing taught point of the assembly 130. As desired, multiple reference points can be taught in turn.

At step 204, a gage (such as 152) is installed onto the end effector 140. Once installed, the end effector and gage are moved to an existing taught point at step 206. The taught point can be expressed as coordinates along one or more axes, such as along the x axis or along the x-y plane (FIG. 2). Preferably, this will dispose the probe 154 over and in close proximity to the medium 164.

The probe is moved (e.g., lowered) at step 208 to formed the witness mark 166 on the medium. Using the foregoing example, this will preferably comprise maintenance of the probe 154 at the existing taught x or x-y coordinates while reducing the z-axis elevation of the end effector 140. This step can be carried out automatically, or through user input using the GUI 176.

Once the witness mark has been formed, the end effector 140 is preferably retracted out of the way to allow the vision system to detect the witness mark, step 210. Preferably, the mark is substantially circular and the vision system detects one or more coordinates (x, y, etc.) of the center of the mark. As desired, the vision system can locate at least one additional datum point on the base 160 (such as edge 168) to further assist in the location of the mark.

The CPU 170 compares the witness mark location to the existing taught point to determine the error distance therebetween, and uses this error distance to generate an updated taught point at step 212. In some preferred embodiments, the correction takes place automatically and the new updated taught point is stored in MEM 172 for future control efforts. Alternatively, the user can manually enter new taught points or mechanically adjust the assembly 130. The routine then ends at step 214.

Figure 10:
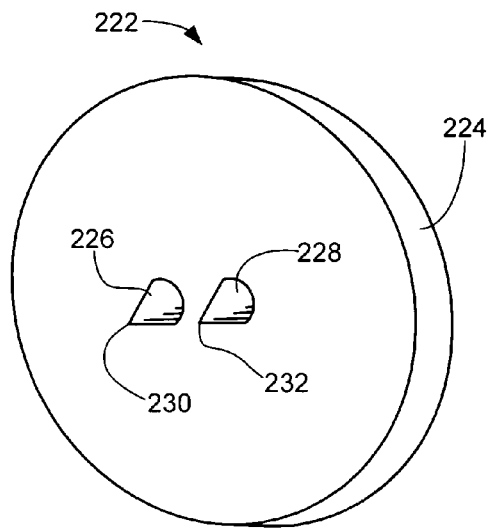
FIG. 10 is an isometric representation of an alternative gage to that introduced in FIG. 3.
Figure 11:
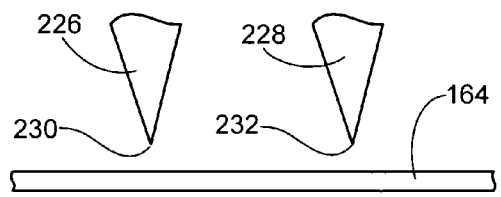
FIGS. 11 and 12 show a corresponding sequence whereby the alternative gage of FIG. 10 is advanced to form a tandem pair of witness marks.
Figure 12:
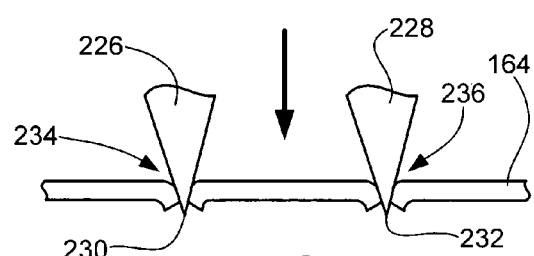

FIG. 10 illustrates an alternative gage 222 that can be used in lieu of the gage 152 of FIG. 3. The gage 222 includes a body 224 and two adjacent probes 226, 228 with respective distal ends 230, 232. As shown in FIGS. 11 and 12, the probes 226, 228 are concurrently moved to form two witness marks 234, 236 on the medium 166.

Figure 13:
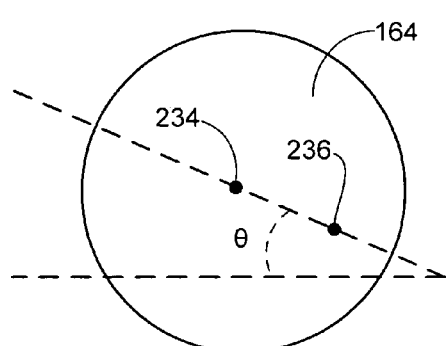
FIG. 13 is a top plan representation of the medium with the witness marks formed in FIG. 12.

While the separation distance between the resulting marks 234, 236 will nominally remain constant, the relative locations of the marks on the medium will vary depending on the error in the existing taught point. Thus, as shown in FIG. 13, the marks 234, 236 can further be utilized to determine and correct rotational angle error as well as linear directional error.

Figure 14:
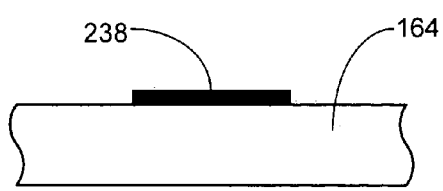
FIG. 14 shows an alternative embodiment for the medium in which ink is applied by the gage to form the witness mark.

While the preferred witness mark methodology has been described as a punched hole in the medium, such is not necessarily required. For example, FIG. 14 provides an alternative embodiment wherein the gage 152, 222 is configured to provide an indelible mark external to the medium, such as by the application of ink 238 or other substance that can be transferred from the gage to the medium during movement of the end effector 140. In another alternative embodiment, pressure sensitive paper (such as "NCR" or "carbon" paper) can be used so that pressure from the gage 152, 222 to form an internal mark 240.

Several operational advantages arise from the various preferred embodiments disclosed herein. First, the routine 200 of FIG. 9 can be easily implemented without significant downtime and operator activity; preferably all that is generally required by the operator is installation of the gage and placement of the medium in the target location.

Permanent incorporation of the probe into the design of the end effector can further simplify the process, since this eliminates the need for user intervention to install the gage 152, 222.

The computational requirements to arrive at the updated taught point are also significantly reduced as compared to the prior art. This is because the reference mark is preferably made while the end effector is at the current taught point; hence, the error between the actual location and the mathematical representation of this location is readily and accurately determined.

Another advantage is that the detection preferably does not require detection of the end effector itself, as in the prior art. Rather, the demands on the vision system are greatly simplified and limited to detecting an easily observable, precisely formed mark, preferably in an area where the existing vision system is already set up to observe. Use of a medium with a high surface reflectivity is preferred to enhance the detection of a dark, non-reflective mark.

Still another advantage is that taught points can be formed in any axis, or any combination of axes. The medium is preferably lightweight, highly portable and can be oriented horizontally, vertically, upside down, or any other desired angle and planar position.

It will be noted that the two-probe gage 222 of FIG. 10 can provide accurate determination of reference point error for all four axes x, y, z and θ through a single marking operation. That is, the x and/or y coordinates can be determined from the centers of one or both marks 234, 236 (FIG. 13). The angle θ coordinate can be determined from the angle of the centerline that joins these marks.

The z axis coordinate can be determined in relation to the diameter(s) of the marks. Due to the tapered nature of the probes, generally the greater the insertion depth, the wider the marks will be; hence, in some applications insertion depth can be correlated to mark diameter. A fifth coordinate axis, that is, rotation of the end effector with respect to the x-y plane, can also be verified during this step in relation to differences in the diameters of the respective marks 234, 236.

A statistical study confirmed that the above preferred embodiments provided significantly improved accuracy in the teaching process as compared to a prior art approach that involved user alignment of a feature on the end effector with a predetermined reference mark. The prior art approach provided a mean positional error of 6.286 mils ($6.286 \times 10^{-3}$ inches) and a standard deviation σ of 3.867 mils. This was reduced through the use of the above embodiments to a mean positional error of 0.707 mils and a standard deviation σ of 0.367 mils.

It will now be appreciated that preferred embodiments of the present invention are generally directed to an apparatus and method for reference point teaching for an articulated member, such as a robotic arm.

In accordance with some preferred embodiments, the method preferably comprises steps of using a control circuit (such as 170, 172, 178, 180) to move (such as by step 208) an end effector (such as 140) to form a witness mark (such as 166, 234, 236) on a medium (such as 164). An updated reference point is generated (such as by step 212) in relation to a detected coordinate of the witness mark (such as x, y, z and/or θ at 142), the updated reference point used to control subsequent movement of the end effector.

Preferably, a gage (such as 152, 222) is attached to the end effector, the gage comprising a tapered probe (such as 156, 226, 228) with a distal end (such as 158, 230, 232) which contactingly engages the medium to form the witness mark. The moving step preferably comprises placing (such as by step 206) the end effector at a current reference point defined by at least one coordinate (such as 142), and advancing (such as 206) the end effector while maintaining the end effector at said at least one coordinate so that the distal end of the gage contactingly engages the medium to form said witness mark.

The generating step preferably comprises calculating an error distance between the witness mark and a current reference point for the end effector, and determining the updated reference point in relation to the error distance.

Figure 15:
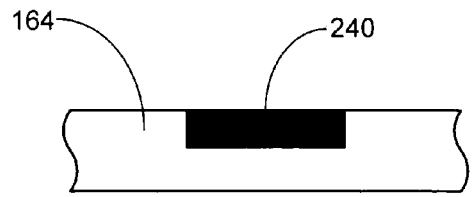
FIG. 15 shows another alternative embodiment in which the medium is characterized as pressure-sensitive paper (such as "NCR" or "carbon") paper so that the mark is formed through the application of pressure to the paper.

The medium preferably comprises paper, and the witness mark preferably comprises a hole punched through the paper (such as in FIGS. 6 and 12). Alternatively, the paper comprises pressure sensitive paper (such as in FIG. 15) and the mark is formed by application of localized pressure to the pressure sensitive paper.

The method further preferably comprises moving (such as by step 210) the end effector away from the witness mark to facilitate detection of the witness mark by a vision system (such as 150, 184). Preferably, the control circuit comprises a programmable processor (such as 170).

In accordance with other preferred embodiments, the apparatus preferably comprises an end effector (such as 140) configured for controlled movement, and a medium (such as 164) configured for placement at a target location accessible by the end effector. A control circuit (such as 170, 172, 178, 180) places the end effector at a current reference point defined by at least one coordinate (such as by step 206), advances the end effector to form a witness mark on the medium (such as by step 208), and determines an updated reference point in relation to an error distance between the current reference point and the witness mark (such as by step 212).

The apparatus further preferably comprises a gage (such as 152, 222), the gage comprising a tapered probe (such as 156, 226, 228) with a distal end (such as 158, 230, 232), wherein the distal end contactingly engages the medium to form the witness mark. As before, the medium preferably comprises paper, and the mark is formed by punching a hole in the paper (such as in FIGS. 6 and 12). Alternatively, the paper comprises pressure sensitive paper and the mark is formed by the application of pressure thereto (such as FIG. 15).

The apparatus further preferably comprises a vision system (such as 150, 184) and the control circuit further operates to retract the end effector away from the witness mark (such as by step 210) to facilitate detection of the witness mark by the vision system, and wherein the error distance is generated in relation to said detection of the witness mark by the vision system. The apparatus further preferably comprises a base (such as 160) which supports the medium at the target location, and wherein the error distance is further determined in relation to a datum feature (such as 168) of the base.

For purposes of the appended claims, the recited first means will be understood consistent with the foregoing discussion to correspond to at least the gage 152, 222, the medium 164, and the components of FIG. 8 configured to operate in accordance with the flow of FIG. 9. Prior art systems that require user judgment to align the end effector with a predetermined mark on a workpiece or other member, prior art systems that require use of a vision system to detect a feature on the end effector to generate the updated reference point, and manual systems that do not use a control circuit are not included within the scope of this element, and are expressly excluded from the definition of an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular environment without departing from the spirit and scope of the present invention.

In addition, although the embodiments described herein are generally directed to an articulated member used during the manufacturing of a data storage device, it will be appreciated by those skilled in the art that the claimed subject matter is not so limited and various other arrangements and environments can be utilized without departing from the spirit and scope of the claimed invention.

What is claimed is:

1. A method comprising steps of using a control circuit to move an end effector to form a witness mark on a medium, and generating an updated reference point used to control subsequent movement of the end effector in relation to an error distance between the witness mark and a current reference point for the end effector.

2. The method of claim 1, further comprising a step of attaching a gage to the end effector, the gage configured to form said witness mark.

3. The method of claim 2, wherein the using step comprises placing the end effector at a current reference point defined by at least one coordinate, and advancing the end effector while maintaining the end effector at said at least one coordinate so that a distal end of the gage contactingly engages the medium to form said witness mark.

4. The method of claim 1, wherein the generating step comprises detecting a coordinate at which the witness mark is formed, calculating the error distance between the detected coordinate of the witness mark and a current reference point for the end effector, and determining the updated reference point in relation to the error distance.

5. The method of claim 1, wherein the witness mark comprises a hole punched through the medium.

6. The method of claim 1, wherein the medium comprises paper.

7. The method of claim 1, wherein the medium comprises pressure sensitive paper, and wherein the mark is formed by application of localized pressure to the pressure sensitive paper.

8. The method of claim 1, further comprising steps of moving the end effector away from the witness mark and utilizing an electronic vision system to detect the witness mark, wherein the moving and utilizing steps are carried out after the using step and prior to the generating step.

9. The method of claim 1, further comprising a prior step of placing the medium at a target location adjacent a current reference point of the end effector, and wherein the using step comprises placing the end effector at a current reference point defined by at least one coordinate, and advancing the end effector toward the medium to form the witness mark while maintaining the end effector at said at least one coordinate.

10. The method of claim 1, wherein the witness mark comprises two spaced apart marks formed concurrently on the medium.

11. An apparatus comprising:
an end effector configured for controlled movement;
a medium configured for placement at a target location accessible by the end effector; and
a control circuit which places the end effector at a current reference point defined by at least one coordinate, advances the end effector to form a witness mark on the medium, and determines an updated reference point in relation to an error distance between the current reference point and the witness mark.

12. The apparatus of claim 11, further comprising a gage supported by the end effector, the gage comprising a tapered probe with a distal end, wherein the distal end contactingly engages the medium to form the witness mark.

13. The apparatus of claim 11, wherein the medium comprises paper.

14. The apparatus of claim 13, wherein the witness mark comprises a hole punched through the paper.

15. The apparatus of claim 13, wherein the paper comprises pressure sensitive paper, and wherein the witness mark is formed by application of localized pressure to the pressure sensitive paper.

16. The apparatus of claim 11, further comprising an electronic vision system, wherein the control circuit further operates to retract the end effector away from the witness mark to facilitate detection of the witness mark by the vision system, and wherein the error distance is generated in relation to said detection of the witness mark by the vision system.

17. The apparatus of claim 11, further comprising a base which supports the medium at the target location, and wherein the error distance is further determined in relation to a datum feature of the base.

18. An apparatus comprising:
an end effector configured for controlled movement; and
first means for generating an updated reference point for the end effector in relation to an error distance between a current reference point for the end effector and a witness mark formed by the end effector.

19. The apparatus of claim 18, wherein the first means comprises:
a medium configured for placement at a target location accessible by the end effector;
a gages supported by the end effector and configured to form the witness mark on the medium; and
a control circuit which places the end effector at the current reference point for the end effector defined by at least one coordinate, advances the end effector so that a distal end of the gage contactingly engages the medium to form the witness mark, and determines the updated reference point in relation to the error distance between the current reference point and the witness mark.

20. The apparatus of claim 19, wherein the medium comprises paper.

21. A method comprising steps of using a control circuit to move an end effector to form a hole in a medium, and generating an updated reference point to control subsequent movement of the end effector in relation to a detected coordinate of said hole.

22. The method of claim 21, wherein the using step comprises concurrently forming two spaced holes in the medium, and the generating step comprises generating the updated reference point in relation to detected coordinates of said two spaced apart holes.

23. The method of claim 21, further comprising detecting the hole with an electronic vision system to identify the detected coordinate of said hole.

24. The method of claim 21, wherein the using step comprises using a tapered probe configured to form a variable diameter hole in the medium in relation to different insertion depths of the probe, and wherein the detected coordinate comprises a z axis component orthogonal to a plane along which the medium extends and which is determined in relation to an overall width to the hole.

* * * * *